(12) United States Patent
Moeller

(10) Patent No.: US 6,236,495 B1
(45) Date of Patent: *May 22, 2001

(54) OPTICAL DISPERSION COMPENSATION

(75) Inventor: Lothar Benedict Erhard Josef Moeller, Nuremberg (DE)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,867

(22) Filed: Oct. 7, 1998

(30) Foreign Application Priority Data

Oct. 7, 1997 (EP) .................................. 97307926

(51) Int. Cl.$^7$ .............................. G02B 6/25; H04B 10/18
(52) U.S. Cl. .......................... 359/337; 359/161; 359/341
(58) Field of Search .................................. 359/161, 174, 359/337, 341

(56) References Cited

U.S. PATENT DOCUMENTS

| | | | | |
|---|---|---|---|---|
| 5,404,413 | * | 4/1995 | Delavaux et al. | 359/173 |
| 5,596,448 | | 1/1997 | Onaka | 359/341 |
| 5,867,306 | * | 2/1999 | Isshiki | 359/341 |

FOREIGN PATENT DOCUMENTS

| | | | | |
|---|---|---|---|---|
| 0 658 988 A1 | 12/1994 | (EP) | | H04B/10/18 |
| 08095095 | * | 4/1996 | (JP) | . |
| 18097488 | * | 7/1998 | (JP) | . |

OTHER PUBLICATIONS

Delavaux et al, COBRA, Doc. No. XP2036–270, Sta 40216 Jom Comp., Sep. 25, 1994.*

Yamashita et al, Jour. of Lightwave Techn., vol. 14, #3, pp. 385–390; Abst. only herewith, Mar. 1996.*

Chernikov, Taylor "All–Fiber Dispersive Transmission Filters Based On Fiber Grating Reflectors" "2412 Optics Letters" vol. 20 No. 14 Jul. 15, 1995 p. 1586–1588.

* cited by examiner

Primary Examiner—Nelson Moskowitz
(74) Attorney, Agent, or Firm—Martin I. Finston

(57) ABSTRACT

The present invention relates generally to the field of optical communication and particularly to optical communication techniques which compensated for dispersion such as that in optical fibers. Compensation of optical dispersion is achieved with a polarization beam splitter with first, second and third ports, a dispersion compensating fiber, a first return means that changes the mode of polarization of a returned signal and a second return means. One end of the dispersion compensation means is connected to the third port of the polarization beam splitter, the other end is connected to the first return means. The second return means is connected with the second port of the polarization beam splitter, while the first port of the polarization beam splitter forms input and output. As the signal passes through the dispersion compensating fiber four times, the length of the dispersion compensating fiber can be greatly reduced.

19 Claims, 2 Drawing Sheets

OPTICAL DISPERSION COMPENSATION

CROSS-REFERENCE TO RELATED APPLICATION

This application claims priority of European Patent Application No. 97307926.2, which was filed Oct. 7, 1997.

TECHNICAL FIELD

The present invention relates generally to the field of optical communication and particularly to optical communication techniques which compensate for dispersion such as that in optical fibers.

BACKGROUND OF THE INVENTION

Optical communications systems using optical fibers to couple a light source. Such as laser, and a photodetector are now widely used for high speed (for example, Gbit/sec data rates) and long distance (for example, trans-Atlantic or trans-Pacific) communications. Many technical problems have had to be overcome for these systems to reach their present state of development. Perhaps the most widely known problem was caused be the lossy nature of the first silica based optical fibers. The loss in such fibers was greatly reduced, to the order of a tenth of a dB/km or even less, by the development of fibers fabrication techniques that greatly reduced the presence of loss-creating impurities in the fibers.

After low loss optical fibers had been developed, other system parameters became important to the further development of optical communications systems. For example, fibers have chromatic dispersion; that is, the propagation velocity of the radiation depends upon its frequency. Narrow band light sources in the form of solid state lasers were developed. These lasers typically radiated in several relatively closely spaced modes which propagated at different velocities. The presence of multiple modes and the existence of chromatic dispersion limited either the data transmission rate of the transmission distance. Radiation sources, such as distributed feedback (DFB) lasers, that emitted only a single mode were developed to overcome these problems.

However, even the single mode modulated light of a DFB-laser has a finite bandwidth which causes a pulse to spread when chromatic dispersion is present. One approach to solving this problem was served by the development of dispersion shifted fibers, which are often referred to by the acronym DSF. Dispersion shifted fibers have a region of very low or no chromatic dispersion. However, the use of such fibers suffers from several drawbacks. Firstly, the laser must be selected to emit at the frequency at which the fiber has no chromatic dispersion. Secondly, much non-dispersion shifted fiber has already been installed.

Other techniques that compensate for fiber chromatic dispersion are desirable if they overcome the previously discussed limitations imposed be non-dispersion shifted fibers. One technique inserts, at an arbitrary point in the transmission path between the transmitter and the receiver, a dispersion compensating fiber (DCF). The length of fiber is selected to provide dispersion compensation for a certain transmission length and therefore enable transmission over either an extended distance or at a higher rate. This approach suffers from the added cost of the DCF and, more significantly, the losses introduced by such fibers. The losses are at least comparable to the losses in the system fibers and limit the system capabilities.

An apparatus which reduces the costs of the DCF and compensates for the losses introduced by the DCF is known from U.S. Pat. No. 5,404,413, issued Apr. 4, 1995 to Jean-Marc Delavaux et al. Under the title "Optical Circulator for Dispersion Compensation," commonly assigned herewith. (A corresponding European Patent Application EP 0 658 988 A1 was published on Jun. 21, 1995.). The apparatus has an optical circulator with at least first, second and third ports. The apparatus also has return means and a dispersion compensating waveguide, such as a DC-fiber, connecting the return means to the second port. An amplifier is connected to the circulator. The amplifier has a pump laser, a multiplexer, and a doped fiber. The pump laser is connected to the multiplexer, and the fiber amplifier is connected between the return means and the second port of the circulator.

SUMMARY OF THE INVENTION

It is an object of the present invention to provide an apparatus for the compensation of optical dispersion. It is one aim of the invention to further reduce the costs of the optical dispersion compensation.

According to a first aspect of the invention there is provided a method of compensating for optical dispersion of an optical signal passing through an optical communication system comprising steps of:

coupling the optical signal from the communication system into a dispersion compensating device and passing said optical signal through said dispersion compensating device for a first time;

returning said optical signal and passing said optical signal back though said dispersion compensating device for a second time; and characterized by returning said optical signal to pass back through said dispersion compensating device for at least a third time before coupling said optical signal back into said communications system.

According to a second aspect of the invention there is provided apparatus for compensating for optical dispersion of an optical signal passing through an optical communication system comprising:

a dispersion compensating device;

an input arrangement for coupling the optical signal from the communication system into the dispersion compensating device and for passing said optical signal though said dispersion compensating device for a first time;

a first return device, connected to said compensating device, for returning said optical signal back through said dispersion compensating device for a second time;

an output arrangement for coupling said optical signal back into said communication system; and characterized in that a second return device is connected to said input arrangement for returning said optical signal back though said dispersion compensating device for at least a third time before said optical signal is passed to said output arrangement.

An advantage of the present invention is that it allows further reduction in the length of the dispersion compensating fiber needed to compensate for the dispersion of the optical transmission line.

In particular, the object is achieved by providing an apparatus for compensation of optical dispersion which has a polarization beam splitter with a first, second and third port, a dispersion compensation means, a first return means that changes the direction of polarization of the returned signal and a second return means. One end of the dispersion compensation means is connected to the third port of the polarization beam splitter, the other end is connected to the first return means. The second return means is connected with the second port of the polarization beam splitter. The first port of the polarization beam splitter forms input and output of the apparatus for input and output signals of different polarization mode.

In a preferred embodiment, an optical circulator having a first, a second, and a third port is connected with its second port connected to the first port of the polarization beam splitter. The first and third ports of the optical circulator are connected to optical fibers which form an optical transmission line.

The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

DETAILED DESCRIPTION

Figure 1:
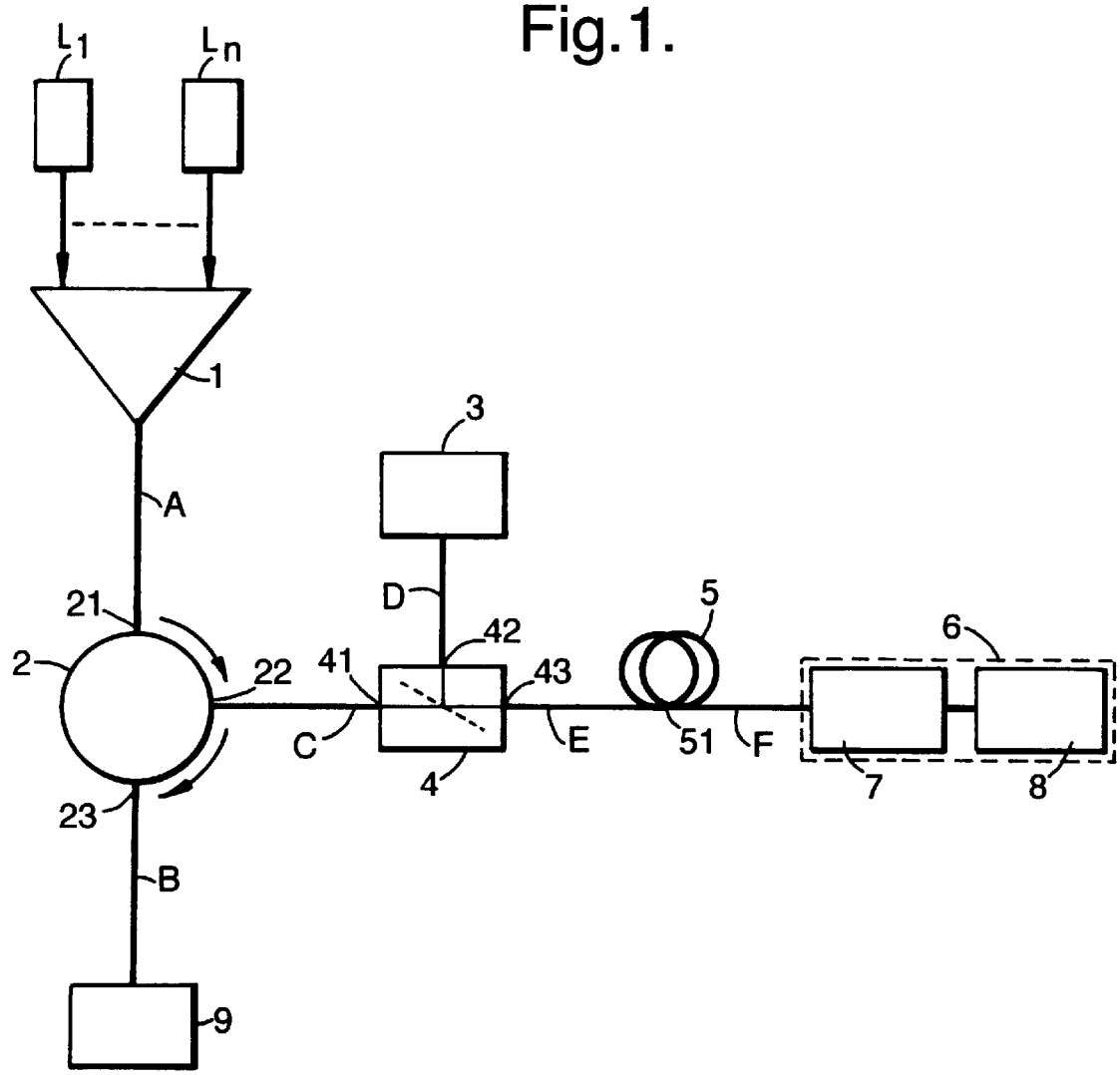
FIGS. 1 and 2 show schematic representations of apparatus according to this invention, for unidirectional and for bidirectional transmission, respectively.

Depicted in FIG. 1 are transmitters $L_l$ to $L_n$, an optical multiplexer 1, an optical circulator 2, a polarization beam splitter 4, a dispersion compensation means 5, a first return means 6, a second return means 3, a receiver 9 and optical fibers A to F, interconnecting the components mentioned above.

The transmitters $L_l$ to $L_n$ provide optical signals, typically as modulated radiation, from semiconductor lasers. The optical multiplexer 1 may be in particular a wavelength selective multiplexer. It combines the signals of the transmitters $L_l$ to $L_n$. The circulator 2 has a first port 21, a second port 22, and a third port 23. The receiver 9 may be built up in particular from and optical demultiplexer and photodetectors that detect radiation and convert it into electrical signals. The depicted optical fibers A to F may be silica based single mode fibers. The characteristics of the fiber depend upon the wavelength of the optical signals. The polarization beam splitter 4 allows an optical signal of a radiation of a first polarization mode, e.g. the TE mode, to pass though it via a first port 41 to a third port 43 and vice versa. An optical signal or a radiation with a polarization being rotated by 90 degrees, e.g. the TM mode, is passed from either its first port 41 or its third port 43 to a second port 42. The first and second return means 6 and 3 may each be made of a dielectric mirror or a grating which may be written into the fibers F and D. The use of either linear of chirped gratings as return means 6 and 3 is within the scope of this invention.

The first return means 6 includes, in addition, a Faraday rotator 7 which rotates the polarization of a signal or a radiation applied to it by 90 degrees. A mirror or grating 8 and the Faraday rotator 7 of the first return means 6 can be either separate, discrete elements of their functions may be combined in a single element. The dispersion compensation means 5 may be dispersion compensating fiber (DCF). The length of the DCF required depends on its own characteristics and on the length and the characteristics of the optical fibers A and B. From the art it is well known that, in principle, the length of the DCF will be selected in such a way that the dispersion of the optical fibers A and B, forming and optical transmission line, will be compensated completely. The length of the DCF necessary for this invention will become apparent from the following.

As mentioned above, the optical signal is produced by the transmitters $L_l$ to $L_n$ and the optical multiplexer 1. Within the transmitters $L_l$ to $L_n$ lasers provide the modulated radiation. It is known that the radiation of lasers has preferred modes of polarization. To ensure that the radiation of all transmitters $L_l$ to $L_n$ has only one polarization mode, e.g. the TE mode, a polarization controller or a polarization maintaining fiber can be used. After the multiplexer 1 has combined the signals of the transmitters $L_l$ to $L_n$ being generated in such a manner as explained above, the optical signal is coupled into the optical fiber A. The optical fiber A is connected to the first port 21 of the optical circulator 2 which couples the optical signal into the optical fiber C, which is in turn connected to the second port 22 of the optical circulator 2. The other end of the optical fiber C is connected to the first port 41 of the polarization beam splitter 4. As explained above, the optical signal with the predetermined polarization mode TE passes through the polarization beam splitter 4 and is coupled into the optical fiber E which is connected to the third port 43 of the polarization beam splitter 4. The other end of the optical fiber E is connected to the DCF 5 which is connected via optical fiber F to the first return means 6. It is also possible to directly connect the DCF 5 to the output 43 of the polarization beam splitter 4 and the input of the first return means 6.

The optical signal is reflected by the mirror 8 of the first return means 6 and its polarization is rotated by the Faraday rotator 7, which is part of the first return means 6 by 90 degrees to the second polarization mode TM. The optical signal again passes the DCF 5 and again comes to the polarization beam splitter 4, via the third port 43. As the polarization mode of the optical signal has been changed by the Faraday rotator 7 of the first return means 6, the optical signal is coupled into optical fiber D which is connected to the second port 42 of the polarization beam splitter 4.

The other end of the optical fiber D is connected to the second return means 3 which reflects the optical signal. The optical signal enters the polarization beam splitter 4 at its second port 42 again and passes through the DCF 5 for the third time.

At the first return means 6 the optical signal is reflected again by the mirror 8 and its polarization is rotated by 90 degrees for the second time by the Faraday rotator 7, so that the optical signal's polarization mode is again TE.

The optical signal passes the DCF 5 for the fourth time and passes through the polarization beam splitter 4 via third port 43 to first port 41. The optical signal is coupled into the second port 22 of the optical circulator 2 through the optical fiber C.

The optical circulator 2 couples the optical signal into the optical fiber B which is connected to its third port 23. Finally the optical signal is received be the receiver 9 for further processing.

As can be seen from the above description, the length of the DCF 5 necessary for the present invention is only a quarter of the length usually required or half of the length as known from the state of the art, as discussed in the above mentioned U.S. Pat. No. 5,404,413.

It is another advantage that because of the rotation of the polarization by 90 degrees, compensation for polarization mode dispersion caused by the DCF 5 is achieved, as the optical signal passes the DCF 5 four times in different polarization modes.

To compensate for the losses of the optical signal caused by the DCF 5, fiber amplifiers can be used, for example, Erbium Doped Fiber Amplifiers (EDFA). One or more fiber amplifiers may be inserted anywhere along the path of the optical signal, e.g. at the positions denoted by A, B, C, D, E and F in the optical fibers. It is also possible to cut the DCF 5 at an arbitrary position 51 and place a fiber amplifier to connect the two parts of the cut DCF 5. It is another possibility to use the DCF 5 itself as fiber amplifier by pumping light into the DCF 5. Such an amplifier is also called a Raman Fiber Amplifier.

It also is advantageous to insert a polarization sensitive filter at any of the positions D, E, F or 51 to equalize the power level along the propagation path.

Figure 2:
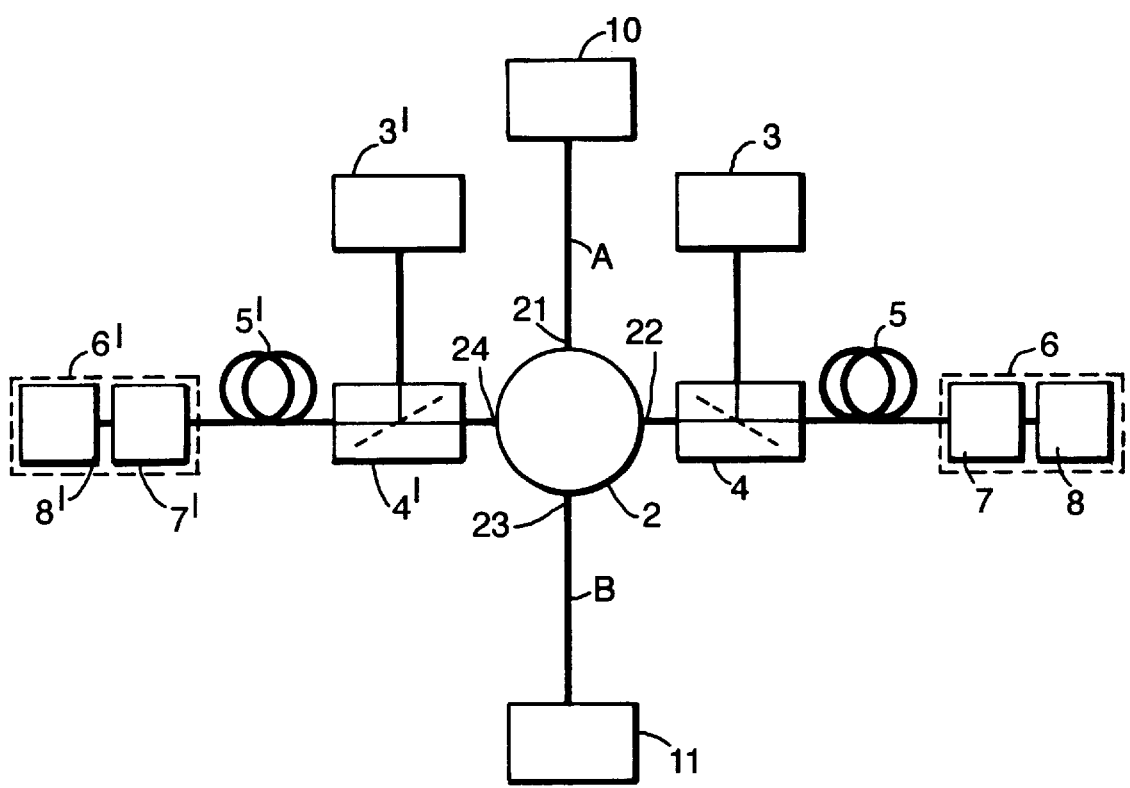

The foregoing describes a unidirectional signal transmission. It is obvious, however, that the invention is also applicable to bidirectional transmission as shown in FIG. 2. Depicted are transceivers 10 and 11 which are connected to first port 21 and third port 23 of an optical circulator 2. Transceivers 10 and 11 have first transmitter and second receiver and first receiver and second transmitter, respectively. The transmitters and receivers are not shown individually for reasons of clarity. For bidirectional transmission, the optical circulator 2 requires four ports, the fourth port 24 being used to connect a second apparatus comprising further polarization beam splitter 4', DCF 5' and returning means 3' and 6', while the apparatus as described above is connected to second port 22. For more detail reference to U.S. Pat. No. 5,404,413, cited above, can be made.

By way of example, the present invention has been described using an optical signal composed of a plurality of single signals, combined by wavelength division multiplexing (WDM). It is obvious that the invention is not limited to WDM, and is applicable to other optical signals.

The invention claimed is:

1. A method of compensating for optical dispersion of a polarized optical signal passing through an optical communication system, comprising the steps of:
   coupling the optical signal from the communication system into a dispersion compensating device and passing the optical signal through the dispersion compensating device in a first pass;
   returning the optical signal and passing the optical signal back through the dispersion compensating device in a second pass;
   between the beginning of the first pass and the end of the second pass, rotating the polarization of the optical signal to a polarization direction that is blocked by a polarization-selective element from re-entry into the communication system;
   then returning the optical signal from the blocking polarization-selective element back through the dispersion compensating device in one or more further passes;
   between the beginning and the end of said one or more further passes, further rotating the polarization of the optical signal to a polarization direction that is admitted by a polarization-selective element for re-entry into the communication system; and
   after said one or more further passes, coupling the optical signal back into the communication system via the admitting polarization-selective element.

2. A method according to claim 1, comprising rotating the polarization of the optical signal after the first pass but before the second pass.

3. A method according to claim 1, comprising passing said optical signal back through said dispersion compensation device for a third and a fourth pass.

4. A method according to claim 3, comprising rotating the polarization of the optical signal after the third pass but before the fourth pass.

5. A method according to claim 3, comprising coupling said optical signal back into said communication system after the fourth pass.

6. Apparatus for compensating for optical dispersion of an optical signal passing though an optical communication system, comprising:
   a dispersion compensating device;
   an input-output arrangement for coupling the optical signal from the communication system into the dispersion compensating device and for coupling the optical signal from the dispersion compensating device into the communication system;
   a first return device, effective after a first pass of the optical signal through the dispersion compensation device for returning the optical signal back through the dispersion compensation device in a second pass;
   a polarization rotator effective for rotating the polarization of the optical signal such that said polarization after the second pass is different from the polarization at the beginning of the first pass; and
   a second return device, effective after said second pass for returning the optical signal back through the dispersion compensation device in at least one further pass;
   wherein the input-output arrangement comprises a polarization-selective device operative after the second pass to direct the optical signal to the second return device and operative after at least one further pass to re-admit the optical signal to the communication system.

7. Apparatus according to claim 6, wherein the blocking polarization-selective element and the admitting polarization-selective element are the same element, and said element comprises a polarization beam splitter.

8. Apparatus according to claim 7, wherein the polarization beam splitter has first, second and third ports.

9. Apparatus according to claim 8, wherein the polarization rotator is a Faraday rotator.

10. Apparatus according to claim 9, wherein the optical signal leaves and re-enters the communication system via the first port of the polarization beam splitter.

11. Apparatus according to claim 10, wherein the Faraday rotator and the first return device are combined in a single element.

12. Apparatus according to claim 10, wherein the Faraday rotator rotates the polarization of the optical signal to form a rotated optical signal.

13. Apparatus according to claim 12, wherein the second return device is optically coupled to the second port of the polarization beam splitter.

14. Apparatus according to claim 13, wherein the polarization beam splitter passes the rotated optical signal from the third port to the second port and into the second return device.

15. Apparatus according to claim 14, wherein the rotated optical signal is returned back by the second return device to the second port of the polarization beam splitter.

16. Apparatus according to claim 15, wherein the rotated optical signal passes from the second port of the polarization beam splitter to the third port of the polarization beam splitter and is then passed through the dispersion compensating device for a third pass.

17. Apparatus according to claim 16, wherein after passing through the dispersion compensating device for a third pass, the rotated optical signal is rotated by the Faraday rotator for a second time to form a second rotated optical signal.

18. Apparatus according to claim 17, wherein the second rotated optical signal passes through the dispersion compensating device for a fourth pass.

19. Apparatus according to claim 18, wherein the second rotated optical signal is passed from the third port of the polarization beam splitter to the first port of the polarization beam splitter.

\* \* \* \* \*